(12) United States Patent
Flores Alonso et al.

(10) Patent No.: US 12,053,935 B2
(45) Date of Patent: Aug. 6, 2024

(54) SELF-TAPPING PLASTIC EMBOSSMENT FOR INJECTION MOLDED PARTS

(71) Applicant: Ford Global Technologies, LLC, Dearborn, MI (US)

(72) Inventors: Luis Flores Alonso, Mexico City (MX); Salvador Soriano, Metepec (MX); Pedro Gerardo Vargas Hernández, Iztacalco (MX); Jose Maria Aburto, Coyoacán (MX)

(73) Assignee: Ford Global Technologies, LLC, Dearborn, MI (US)

( * ) Notice: Subject to any disclaimer, the term of this patent is extended or adjusted under 35 U.S.C. 154(b) by 961 days.

(21) Appl. No.: 17/075,037

(22) Filed: Oct. 20, 2020

(65) Prior Publication Data

US 2022/0118716 A1   Apr. 21, 2022

(51) Int. Cl.
| | |
|---|---|
| *B29C 65/56* | (2006.01) |
| *B62D 29/04* | (2006.01) |
| *F16B 5/02* | (2006.01) |
| *F16B 12/16* | (2006.01) |
| B29L 31/30 | (2006.01) |

(52) U.S. Cl.
CPC .......... *B29C 65/562* (2013.01); *B62D 29/048* (2013.01); *F16B 5/02* (2013.01); *F16B 12/16* (2013.01); *B29L 2031/30* (2013.01)

(58) Field of Classification Search
CPC .......... B62D 29/048; F16B 5/02; F16B 12/16; F16B 37/005; F16S 1/10
See application file for complete search history.

(56) References Cited

U.S. PATENT DOCUMENTS

| | | | |
|---|---|---|---|
| 4,026,187 A | * 5/1977 | Gross | F16B 37/005 411/41 |
| 10,006,481 B2 | 6/2018 | Tomatsu | |
| 2011/0025085 A1 | * 2/2011 | Kubo | B60R 13/04 264/219 |

FOREIGN PATENT DOCUMENTS

| | | |
|---|---|---|
| JP | 2006316818 | 11/2006 |
| JP | 2008265026 | 11/2008 |

* cited by examiner

*Primary Examiner* — David Sample
*Assistant Examiner* — Donald M Flores, Jr.
(74) *Attorney, Agent, or Firm* — Burris Law, PLLC

(57) ABSTRACT

A molded part includes a plurality of surfaces and an embossment extending from one of the plurality of surfaces. The embossment includes a body and a bore extending through a central portion of the body. The embossment further includes a first pocket extending through a sidewall of the body and into the bore and a second pocket extending through an opposite sidewall of the body and into the bore. The first pocket and the second pocket each define inwardly tapered walls. The first pocket and the second pocket are spaced axially along the body and are diametrically opposed.

20 Claims, 10 Drawing Sheets

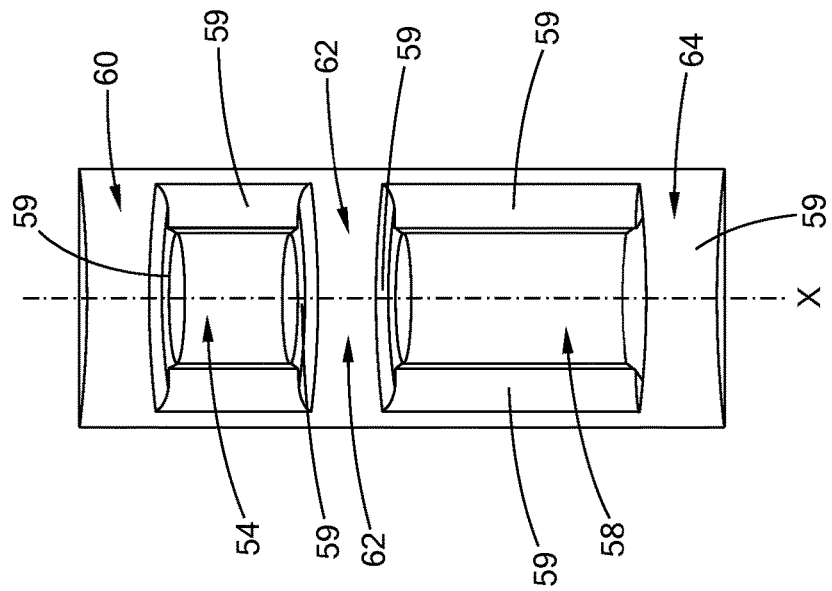
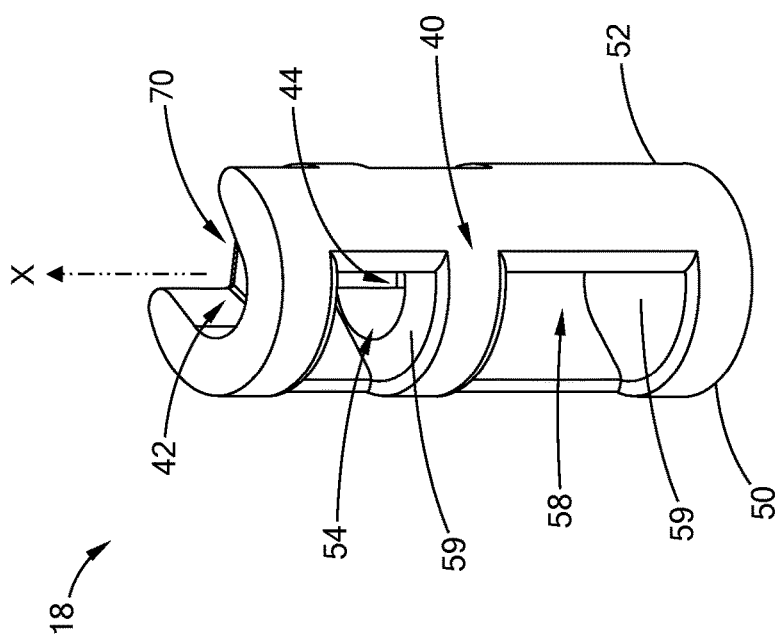
FIG. 6
FIG. 5

SELF-TAPPING PLASTIC EMBOSSMENT FOR INJECTION MOLDED PARTS

FIELD

The present disclosure relates to injection molded parts with embossments for connecting the molded parts to other molded parts or another plastic element by self-tapping screws, and more particularly to the structure of the embossments on the molded parts.

BACKGROUND

The statements in this section merely provide background information related to the present disclosure and may not constitute prior art.

Conventionally, two injection-molded parts may be formed with embossments in order to allow the two injection-molded parts to be connected to each other by self-tapping screws. In addition to the injection molding tool that is required to form the molded parts, forming the embossments on the molded parts requires extra tooling, such as sliders or lifters, to define the shape and structure of the embossments. In a typical molding tool, one or more sliders are inserted into the mold cavity that forms the molded part to define central bores of the embossments. When the embossments are formed in a direction perpendicular to a demolding direction, another mechanism, such as a hydraulic cylinder, is needed to withdraw the sliders from the molds before the molds can be moved and separated in the demolding direction. The extra tooling and mechanism for forming the embossments on the molded parts increase the molding costs.

These issues related to the design and manufacture of embossments in molded parts are addressed by the present disclosure.

SUMMARY

This section provides a general summary of the disclosure and is not a comprehensive disclosure of its full scope or all of its features.

In one form, a molded part includes a plurality of surfaces and an embossment extending from one of the plurality of surfaces. The embossment includes a body and a bore extending through a central portion of the body. The embossment further includes a first pocket extending through a sidewall of the body and into the bore and a second pocket extending through an opposite sidewall of the body and into the bore. The first pocket and the second pocket each define inwardly tapered walls. The first pocket and the second pocket are spaced axially along the body and are diametrically opposed.

In other alternative features of the present disclosure, which may be implemented individually or in any combination: the molded part further includes a third pocket extending through the sidewall of the body and into the bore, the third pocket defining inwardly tapered walls; the bore is cylindrical and has a constant diameter; the body includes a cylindrical outer profile; the sidewall of the body has a constant thickness; the molded part further includes a first wall portion defining a bottom of the first pocket, and a second wall portion defining a bottom of the second pocket; the first wall portion and the second wall portion extend circumferentially around a portion of the body; the body further comprises a tapered upper surface having a recess disposed therein; and the body further includes diametrically opposed vertical wall portions extending along the first and second pockets.

In another form, an assembly of parts is provided, which includes a molded part, an adjacent part and a tapping screw. The molded part includes a plurality of surfaces and an embossment extending from one of the plurality of surfaces. The adjacent part includes a gusset having a central opening. The tapping screw extends through the central opening of the gusset and into the bore of the embossment. The embossment includes a body and a bore extending through a central portion of the body. The embossment further includes a first pocket extending through a sidewall of the body and into the bore and a second pocket extending through an opposite sidewall of the body and into the bore. The first pocket and the second pocket each define inwardly tapered walls. The first pocket and the second pocket are spaced axially along the body and are diametrically opposed.

In still another form, a molded part is provided, which includes a plurality of surfaces and an embossment extending from one of the plurality of surfaces. The embossment includes: a body; a bore extending through a central portion of the body; a plurality of pockets extending through a sidewall of the body and into the bore, the plurality of pockets defining inwardly tapered walls, wherein the plurality of pockets are spaced axially along the body and are sequentially diametrically opposed; and a plurality of wall portions, each wall portion defining a bottom of a respective pocket, wherein the wall portions extend circumferentially around a portion of the body.

A motor vehicle comprising the molded part or assembly of parts having the innovative embossment is also provided by the teachings of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a perspective view of an embossment constructed in accordance with the teachings of the present disclosure;

FIG. 6 is a front view of an embossment constructed in accordance with the teachings of the present disclosure;

Figure 1:
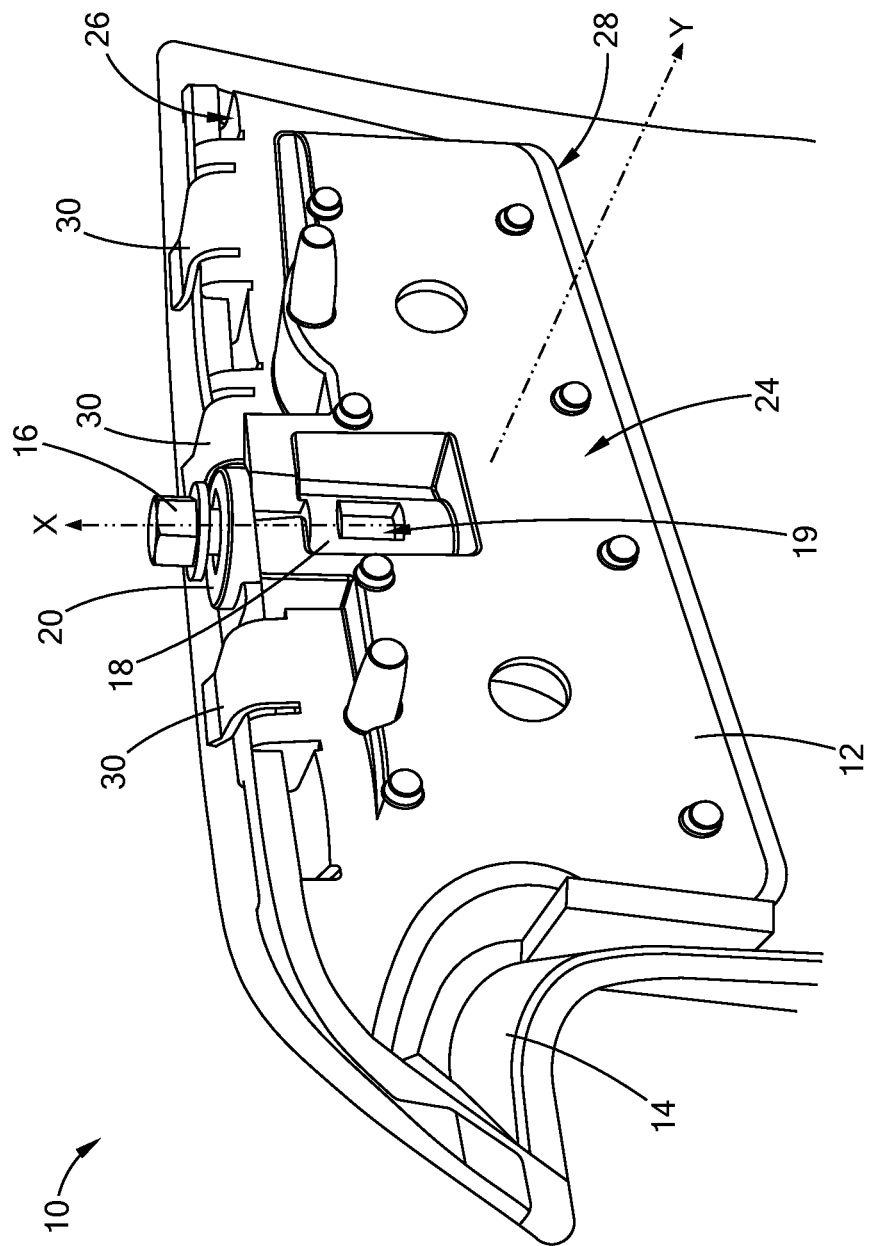
FIG. 1 is a perspective view of an assembly including a first molded part and a second molded part joined by a self-tapping screw through an embossment constructed in accordance with the teaching of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an assembly 10 constructed in accordance with the teachings of the present disclosure includes a first molded part 12, a second molded part 14, and at least one tapping screw 16 that joins the first molded part 12 to the second molded part 14. In this illustrated form of the present disclosure, the first molded part 12 includes an embossment 18, which is described in greater detail below. The second molded part 14 includes a gusset 20 having a central opening (not shown, as the tapping screw 16 is disposed within the central opening). Generally, the first and second molded parts 12 and 14 are fastened together by inserting the tapping screw 16 through the central opening of the gusset 20 and into a central bore 19 of the embossment 18. The assembly 10 as illustrated herein includes parts for use in a motor vehicle. For example, the first molded part 12 may be a bracket, and the second molded part 12 may be a bumper, which is mounted to the motor vehicle by the bracket. However, it should be understood that the assembly 10 of parts could be any number and configuration of parts used in a variety of applications other than motor vehicles while remaining within the scope of the present disclosure.

In this example, the first molded part 12 includes a body portion 24, a plurality of tabs 30, and the embossment 18, among other features as shown. The body portion 24 has a generally flat configuration and defines a first edge 26 and a second edge 28 opposing the first edge 26. The plurality of tabs 30 extend from the first edge 26 of the body portion 24. The embossment 18 is also provided at the first edge 26. The embossment 18 has a longitudinal axis X, which is normal to a face of the body portion 24, in the direction Y as shown, which is parallel to a demolding direction during injection molding, which is described in greater detail below. The first molded part 12 is mounted to the second molded part 14 by engaging the plurality of tabs 30 on a surface of the second molded part 14 and by inserting the tapping screw 16 into the embossment 18.

Figure 2:
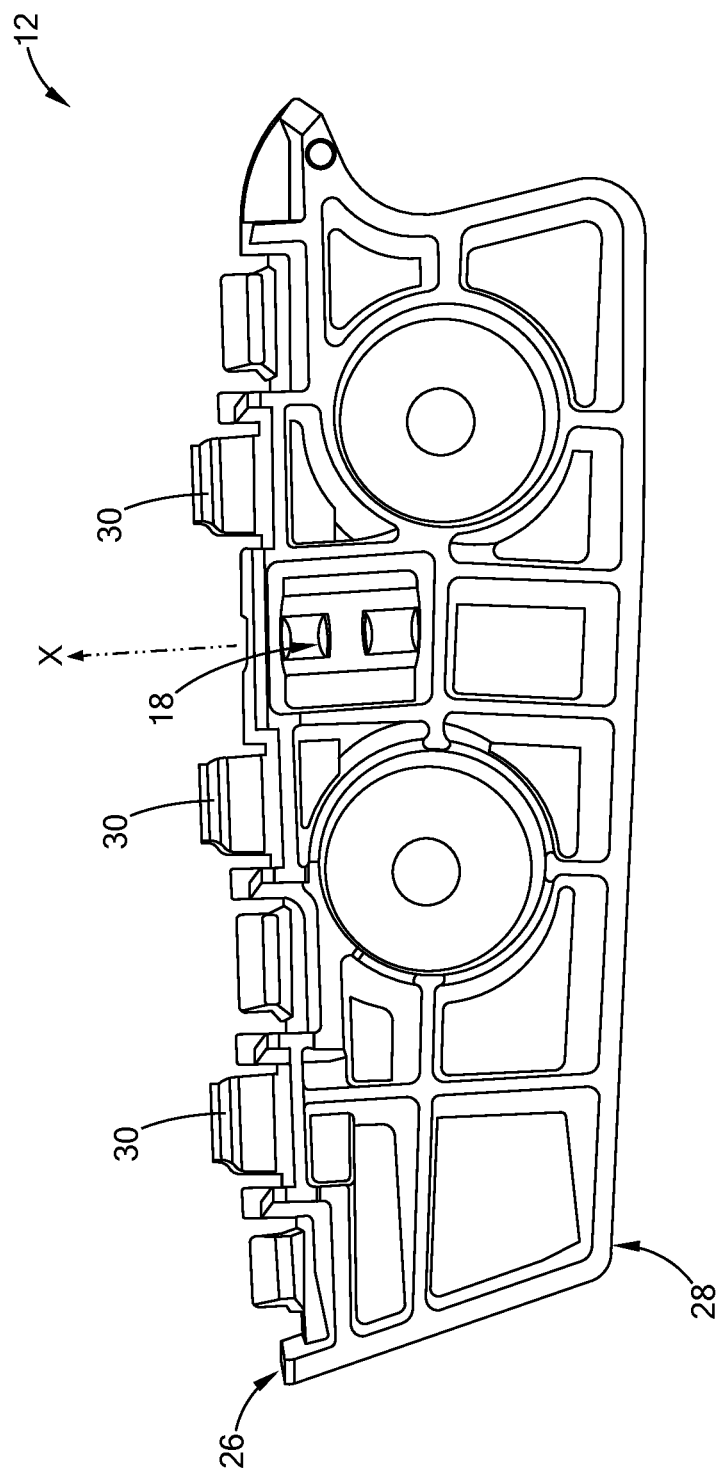
FIG. 2 is a perspective view of a molded part including an embossment constructed in accordance with the teachings of the present disclosure.
Figure 3:
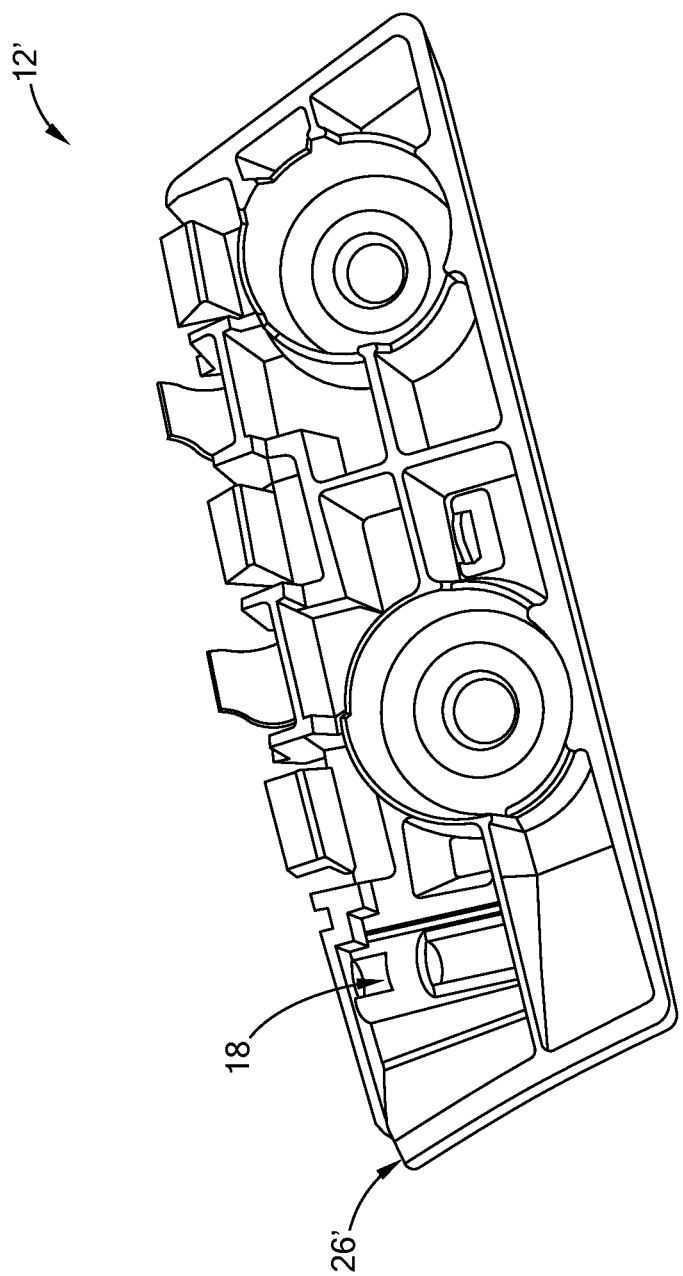
FIG. 3 is a perspective view of a variant of a molded part including an embossment constructed in accordance with the teachings of the present disclosure.
Figure 4:
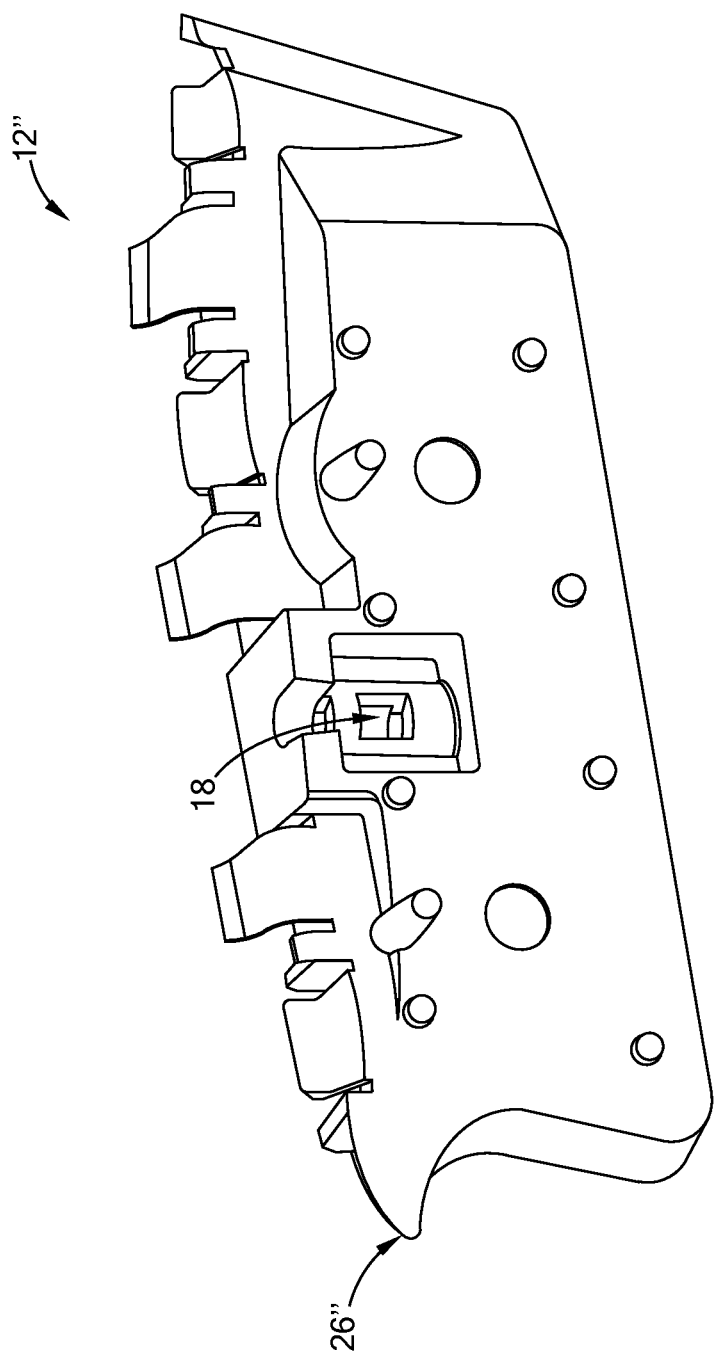
FIG. 4 is a perspective view of another variant of a molded part including an embossment constructed in accordance with the teaching of the present disclosure.

Referring to FIGS. 2 to 4, the embossment 18 may be formed at a middle portion of the first edge 26 of the first molded part 12 (FIG. 2), or proximate an end of the first edge 26' of a first molded part 12', or slightly offset from a first edge 26" of a first molded part 12" (FIG. 3) for insertion of a longer tapping screw 16, depending on the application. These molded parts 12, 12', and 12" are merely exemplary of a part having the innovative embossment 18 according to the teachings of the present disclosure and should not be construed to be limiting of the molded part geometries or location/configuration of the embossment 18.

Figure 7:
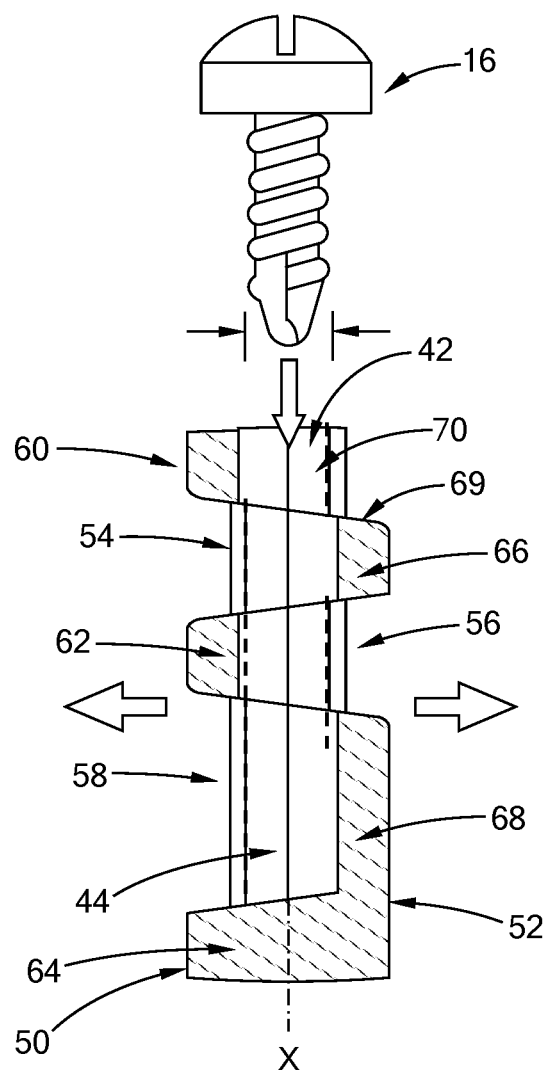
FIG. 7 is a cross-sectional view of an embossment constructed in accordance with the teaching of the present disclosure.

Referring now to FIGS. 5 to 7, the embossment 18 itself is illustrated and described in greater detail. (The embossment 18 is shown by itself, without the part to which it is molded with for purposes of clarity). The embossment 18 includes a body 40, which in this form is cylindrical and has a cylindrical outer profile. The body 40 includes a central portion 42 and defines a bore 44 extending through the central portion 42 along the longitudinal axis X. In one form, the bore 44 also has a cylindrical profile and a constant inside diameter for receiving the tapping screw 16.

The embossment 18 defines a first pocket 54 extending through a sidewall 50 of the body 40 and into the bore 44, and a second pocket 56 extending through an opposite sidewall 52 of the body 40 and into the bore 44. In this form, a third pocket 58 also extends through the sidewall 50 of the body 40 and into the bore 44, although it should be understood that two (2) or more pockets may be employed while remaining within the scope of the present disclosure. As shown, the first and third pockets 54 and 58 extend through the sidewall 50 and into the bore 44 but do not extend through the opposite sidewall 52. The second pocket 56 extends through the opposite sidewall 52 and into the bore 44 but does not extend through the sidewall 50. The first pocket 54 and the third pocket 58 each are diametrically opposed from the second pocket 56, and the pockets 54, 56, and 58 are spaced axially along the body 40.

The sidewall 50 further includes a top portion 60, a first wall portion 62, and a first base portion 64 offset along the longitudinal axis X. The opposite sidewall 52 includes a second wall portion 66 (shown in FIG. 7), and a second base portion 68 offset along the central axis X (shown in FIG. 7). The first wall portion 62 and the second wall portion 66 are diametrically opposed but are offset along the longitudinal axis X. The first wall portion 62 defines a bottom of the first pocket 54. The first base portion 64 defines a bottom of the third pocket 58. As further shown, the body 40 comprises a tapered upper surface 69 having a recess 70 disposed therein.

Each of the first pocket 54, the second pocket 56 and the third pocket 58 is defined by a plurality of inwardly tapered surfaces 59 (best shown in FIGS. 5 and 6) such that each of the first pocket 54, the second pocket 56 and the third pocket 58 has a wider opening proximate the outer surface of the body 40 and a narrower opening proximate the bore 44. The plurality of inwardly tapered surfaces 59 for each pocket are angled surfaces relative to an opening direction (opening direction of a mold) of each pocket. While each of the first, second, and third pockets 54, 56, 58 is shown to be defined by four inwardly tapered surfaces 59, it is understood that only one angled surface can be employed to create a wider opening proximate the outer surface of the body 40 to facilitate demolding without departing from the scope of the present disclosure, which will be described in more detail below.

Figure 8:
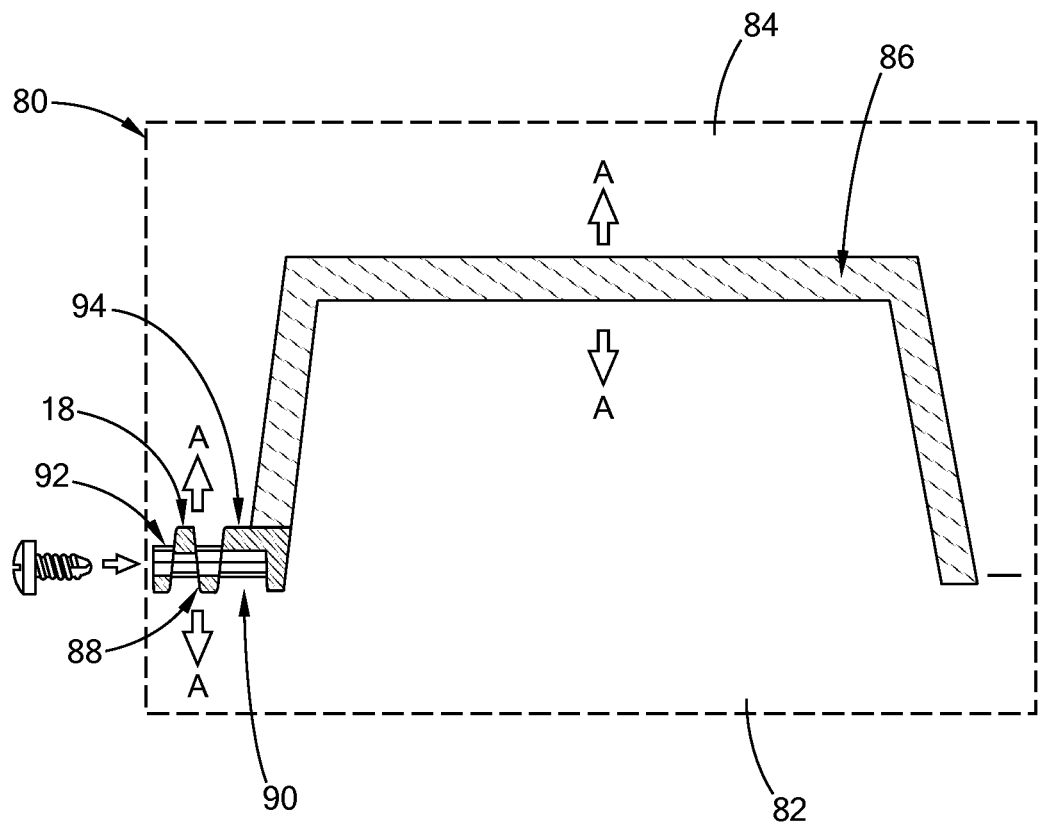
FIG. 8 is a schematic view of an injection molding tool for forming a molded part and an embossment on the molded part in accordance with the teachings of the present disclosure.

Referring to FIG. 8, a molding tool 80 includes a first mold half 82 and a second mold half 84 with a mold cavity 86 therebetween, which generally defines the shape of a molded part, such as the first molded part 12. As previously set forth, the embossment 18 extends in a direction normal to a demolding direction as indicated by arrows A. To form the embossment 18, the first mold half 82 has protrusions 88, 90 formed at an interface between the first mold half 82 and the second mold half 84 and extending toward the second mold half 84 in a direction parallel to the demolding direction A. The protrusions 88, 90 have outer profiles conforming to the inner profiles of the first pocket 54 and 58, respectively.

The second mold half 84 similarly has protrusions 92, 94 formed at the interface between the first mold 8 half 2 and the second mold half 84 and extending toward the first mold half 82 in a direction parallel to the demolding direction A. The protrusions 92, 94 have outer profiles conforming to the inner profiles of the recess 70 and the second pocket 56, respectively. As previously noted, the first, second, and third pockets 54, 56, 58 and the recess 70 are defined by a plurality of inwardly tapered surfaces 59. Therefore, the protrusions 88, 90, 92, 94 each have a wider base portion connected to their respective mold and a narrower tip closer to the other mold. This design allows the protrusions 88, 90, 92, 94 to be relatively easily withdrawn from the embossment 18 after the molded part is formed in the mold cavity 86 without using extra tooling and without risk of damage to the structure of the embossment 18 during demolding.

Figure 10:
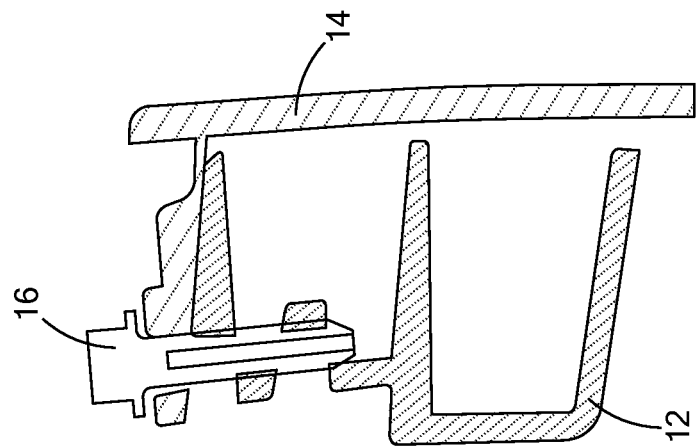
FIG. 10 is a cross-sectional view of an assembly of parts having a gusset constructed according to the principles of the present disclosure.
Figure 9:
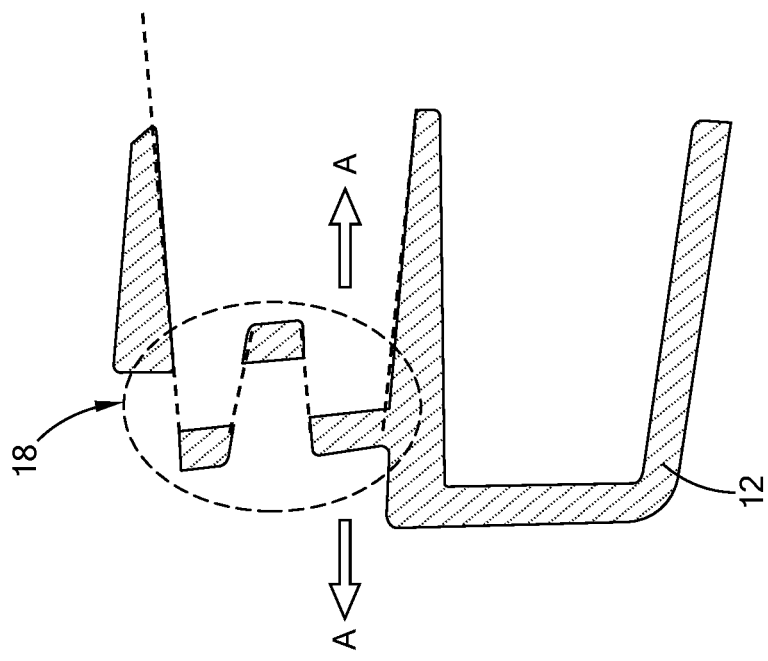
FIG. 9 is a cross-sectional view of a molded part having a gusset constructed according to the principles of the present disclosure.

Referring also to FIGS. 9 and 10 the embossment 18 is shown at an angle relative to the demolding direction A. With the unique design of the pockets, demolding can be achieved more easily as set forth herein and regardless of a tapping direction of the tapping screw 16. As shown, the tapping screw 16 extends through the into the embossment 18 and secures the first molded part 12 to the second molded part 14.

Figure 12:
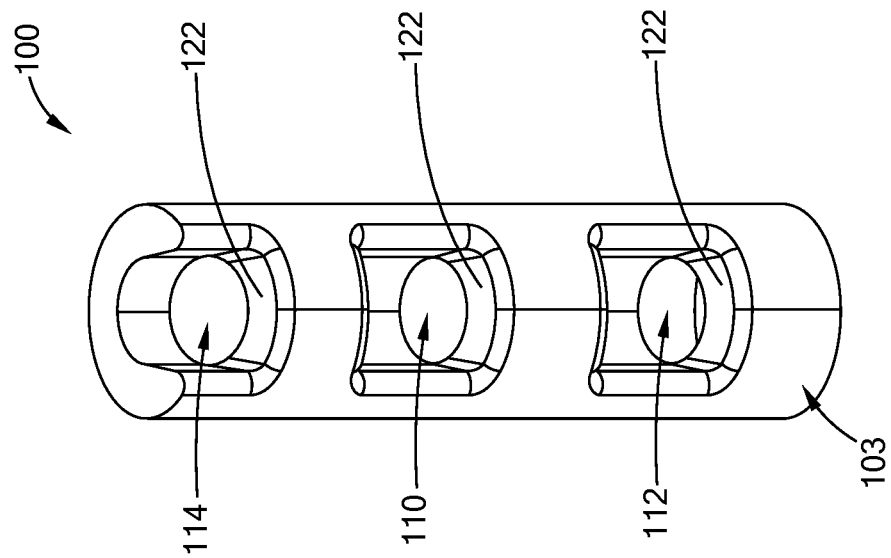
FIG. 12 is a front view of the embossment of FIG. 11.
Figure 11:
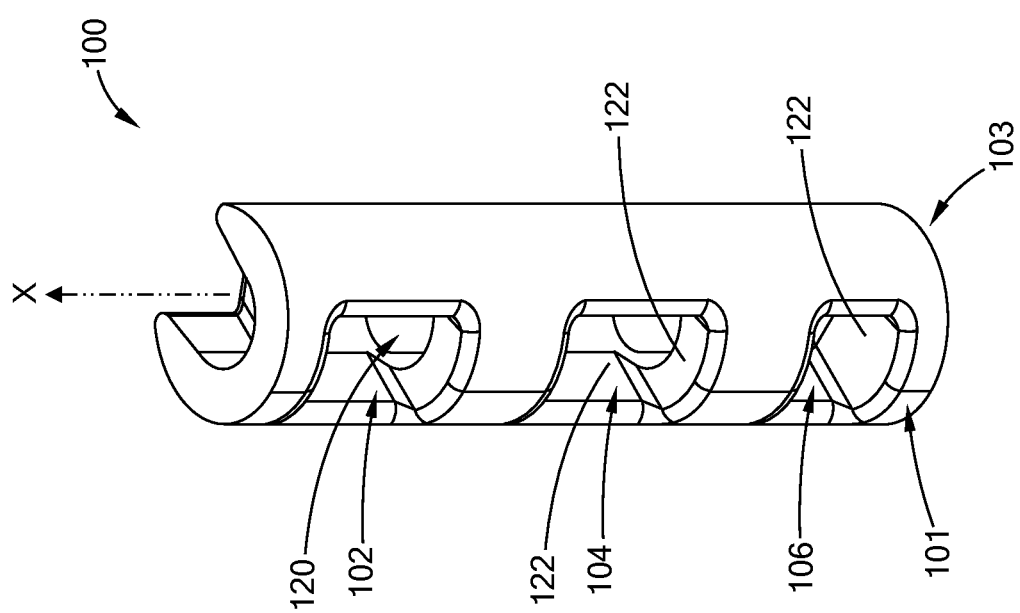
FIG. 11 is a perspective view of a variant of an embossment constructed in accordance with the teachings of the present disclosure.

Referring to FIGS. 11 and 12, a variant of an embossment is illustrated and generally indicated by reference numeral 100. The embossment 100 is structurally similar to that of the embossment 18, differing however in the number of pockets formed in the embossment 100. The embossment 100 includes three (3) pockets 102, 104, 106 extending through the sidewall 101 and into the bore 120 and two pockets 110, 112 and a recess 114 extending through the opposite sidewall 103 and into the bore 120. The sidewalls 101 and 103 are disposed diametrically and offset along a longitudinal axis X of the embossment 100. In one form, the sidewalls 101, 103 of the embossment 100 have a constant thickness.

Similarly, the pockets 102, 104, 106, 110, 112 and the recess 114 are each defined by a plurality of inwardly tapered surfaces 122 such that the pockets and the recess have wider openings proximate the peripheral surface of the embossment and narrower openings proximate the bore 120 of the cylindrical body.

Figure 13A:
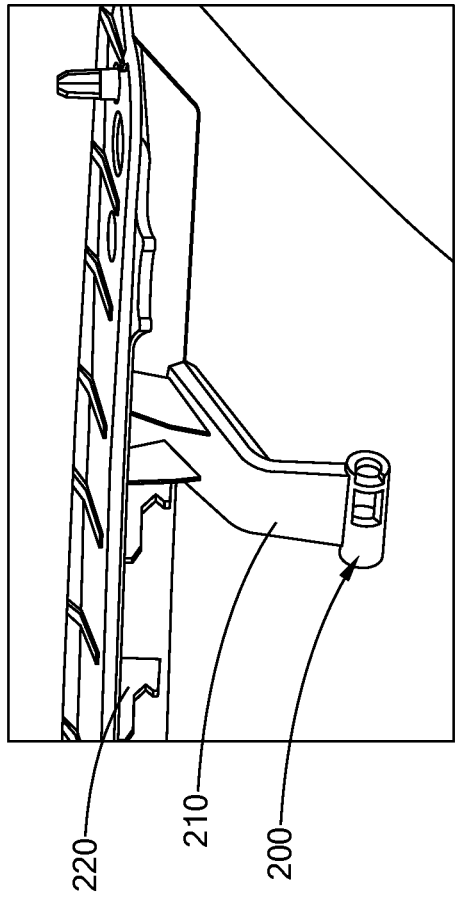
FIG. 13A is a perspective view of an alternative form of an embossment constructed in accordance with the teachings of the present disclosure.
Figure 13C:
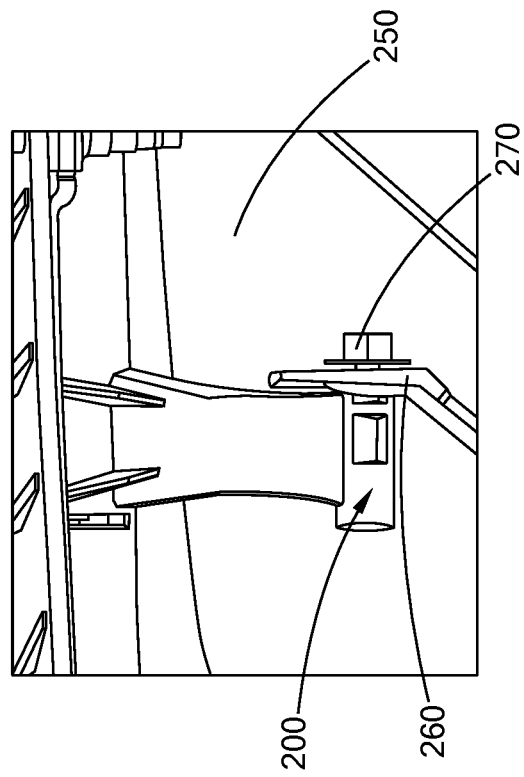
FIG. 13C is another perspective view of the embossment of FIG. 13A with the adjacent part and tapping screw.
Figure 13B:
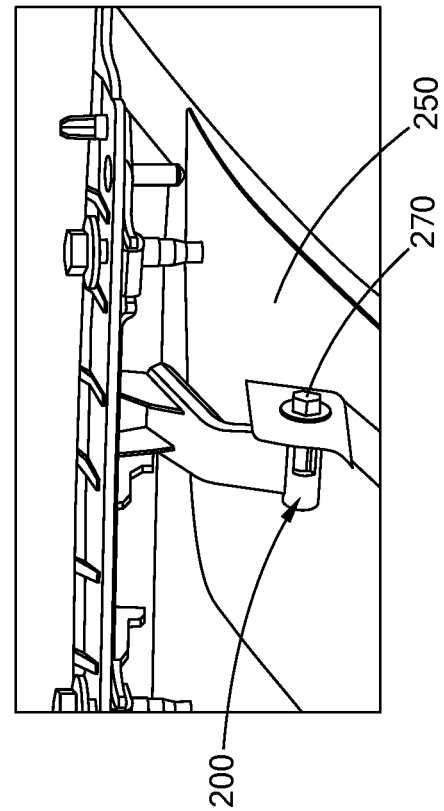
FIG. 13B is a perspective view of the embossment of FIG. 13A with an adjacent part and a tapping screw according to the teachings of the present disclosure.

Referring to FIGS. 13A-13B, yet another form of an embossment is illustrated and indicated by reference numeral 200. The embossment 200 in this form extends from a surface of an end of an arm 210, which is integrally form with a frame 220. As further shown, an adjacent part 250, which in this form also has a gusset 260 and a central opening (not shown), is secured to the embossment 200 via a tapping screw 270. It should be understood that this arrangement of parts and their geometries are merely exemplary and the teachings of the present disclosure may be applied to a wide variety of part configurations.

The embossments constructed in accordance with the teachings of the present disclosure have oppositely arranged pockets as illustrated and described herein. The pockets are open in a direction parallel to the demolding direction and are defined by the molds that also define the overall geometry of the molded part. As a result, no sliders/lifters nor the associated corresponding mechanisms are needed for forming the embossment. The pockets are defined by inwardly tapered surfaces that allow the molds to be relatively easily removed from the embossment without using an external mechanism and without risk of damaging the structure of the embossment. Therefore, manufacturing costs can be reduced.

Moreover, the formation of pockets in the embossment in one application resulted in about a 18.9% weight reduction in comparison to a traditional embossment feature, thereby reducing material costs and injection cycle time.

Further, the embossment constructed in accordance with the teachings of the present disclosure in one form has a central bore with a constant inside diameter without an internal draft angle, which is required in a typical/conventional embossment. Therefore, any residual torque caused by an internal draft angle can be reduced. The molded part with the embossments of the present application can be implemented in many plastic components throughout motor vehicles and other applications to the molded parts that typically use fasteners, such as U-nuts and J-nuts, among others, for fastening. Therefore, the manufacturing costs of the end application, as well as weight, can be reduced.

The design of the embossment of the present disclosure also reduces the probability of flow lines and sink marks in the parts that normally result in quality or appearance issues, reducing the risk of warranties or rework. Design and torque fine tuning is relatively easier by modifying pocket openings/geometry. With the presence of the pockets, the embossment of the present disclosure further allows for visual engagement verification.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A molded part comprising:
 a plurality of surfaces;
 an embossment extending from one of the plurality of surfaces, the embossment comprising:
  a body;
  a bore extending through a central portion of the body;

a first pocket extending through a sidewall of the body and into the bore, the first pocket defining inwardly tapered walls; and a second pocket extending through an opposite sidewall of the body and into the bore, the second pocket defining inwardly tapered walls, wherein the first pocket and the second pocket are diametrically opposed, and wherein the first pocket is located at a first distance from the one of the plurality of surfaces and the second pocket is located at a second distance from the one of the plurality of surfaces, the first distance is different from the second distance.

2. The molded part according to claim 1, further comprising a third pocket extending through the sidewall of the body and into the bore, the third pocket defining inwardly tapered walls.

3. The molded part according to claim 1, wherein the bore is cylindrical and has a constant diameter.

4. The molded part according to claim 1, wherein the body comprises a cylindrical outer profile.

5. The molded part according to claim 1, wherein the sidewall of the body comprises a constant thickness.

6. The molded part according to claim 1, further comprising:
a first wall portion defining a bottom of the first pocket; and
a second wall portion defining a bottom of the second pocket,
wherein the first wall portion and the second wall portion extend circumferentially around a portion of the body.

7. The molded part according to claim 1, wherein the body further comprises a tapered upper surface having a recess disposed therein.

8. The molded part according to claim 1, wherein the body further comprises diametrically opposed vertical wall portions extending along the first and second pockets.

9. An assembly of parts comprising the molded part according to claim 1.

10. A motor vehicle comprising the assembly of parts according to claim 9.

11. An assembly of parts comprising:
a molded part comprising:
a plurality of surfaces;
an embossment extending from one of the plurality of surfaces, the embossment comprising:
a body;
a bore extending through a central portion of the body;
a first pocket extending through a sidewall of the body and into the bore, the first pocket defining inwardly tapered walls; and
a second pocket extending through an opposite sidewall of the body and into the bore, the second pocket defining inwardly tapered walls,
wherein the first pocket and the second pocket are diametrically opposed, and wherein the first pocket is located at a first distance from the one of the plurality of surfaces and the second pocket is located at a second distance from the one of the plurality of surfaces, the first distance is different from the second distance;
an adjacent part comprising a gusset having a central opening; and
a tapping screw extending through the central opening of the gusset and into the bore of the embossment.

12. The assembly of parts according to claim 11, wherein the adjacent part is a molded part.

13. The assembly of parts according to claim 11, wherein the bore is cylindrical and has a constant diameter.

14. The assembly of parts according to claim 11, wherein the sidewall of the body comprises a constant thickness.

15. A motor vehicle comprising the assembly of parts according to claim 11.

16. A molded part comprising:
a plurality of surfaces;
an embossment extending from one of the plurality of surfaces, the embossment comprising:
a body;
a bore extending through a central portion of the body;
a plurality of pockets extending through a sidewall of the body and into the bore, the plurality of pockets defining inwardly tapered walls, wherein the plurality of pockets are spaced axially along the body and are sequentially diametrically opposed; and
a plurality of wall portions, each wall portion defining a bottom of a respective pocket, wherein the wall portions extend circumferentially around a portion of the body.

17. The molded part according to claim 16, wherein the bore is cylindrical and has a constant diameter.

18. The molded part according to claim 16, wherein the sidewall of the body comprises a constant thickness.

19. An assembly of parts comprising the molded part according to claim 16.

20. A motor vehicle comprising the assembly of parts according to claim 19.

* * * * *